(12) United States Patent  
Grass

(10) Patent No.: US 6,282,106 B2  
(45) Date of Patent: Aug. 28, 2001

(54) POWER SUPPLY FOR AN ELECTROSTATIC PRECIPITATOR

(75) Inventor: Norbert Grass, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/740,019

(22) Filed: Dec. 20, 2000

(30) Foreign Application Priority Data

Dec. 23, 1999 (DE) ................................ 199 62 665

(51) Int. Cl.⁷ .................................................. H02M 5/44
(52) U.S. Cl. ................... 363/37; 323/903; 96/82
(58) Field of Search ................... 363/17, 37, 98, 363/132; 323/903; 96/75, 80, 82; 324/459, 466

(56) References Cited

U.S. PATENT DOCUMENTS 4,558,404 * 12/1985 James .............................. 363/37 X  
4,779,182 * 10/1988 Mickal ............................ 363/37 X

* cited by examiner

*Primary Examiner*—Jessica Han  
(74) *Attorney, Agent, or Firm*—Schiff Hardin & Waite

(57) ABSTRACT

In a power supply for an electronic precipitator with a power electronics part, a transformer connected at the output side and a high-voltage rectifier, the transformer and the high-voltage rectifier as well as a device for measured value acquisition are situated in the immediate proximity of the electronic precipitator, and the power electronics part is situated at a location remote from the electronic precipitator and, for control, is coupled to the device for measured value acquisition via optical conductors.

20 Claims, 2 Drawing Sheets

POWER SUPPLY FOR AN ELECTROSTATIC PRECIPITATOR

BACKGROUND OF THE INVENTION

1. Field of the Invention

The present invention is directed to a power supply for electrostatic precipitators of the type having a power electronics stage having a rectifier, intermediate circuit and an inverter, with a transformer connected at the output side, and a high-voltage rectifier, with the transformer and the high-voltage rectifier as well as a device for measured value acquisition situated in the immediate proximity of the electric filter.

2. Description of the Prior Art

Electrostatic precipitators serve for dust removed from gaseous agents in all fields of technology. The gas from which dust is to be removed is conducted between plates that are all grounded and exhibit a spacing of, for example, 600 mm. Wire-shaped spray electrodes that exhibit a highly negative voltage of, for example, 110 kV compared to ground potential are respectively situated therebetween. Due to this high D.C. voltage, the gas molecules are ionized and transfer their charge to dust particles suspended in the gas stream when they strike them. The dust particles become positively charged due to absorbed electrons and migrate to the grounded, negatively charged separation electrode, where they collect and agglomerate into flakes of dust that are stripped from the appertaining plates with vibrators or with a brush mechanism and fall by gravity. This filter method is very efficient but has problems. As a result of the high voltage, voltage arcing regularly occur between the spray electrodes and the plate-shaped separation electrodes. This effect cannot be avoided and is more or less pronounced dependent on the type of dust. The use of electric dust filters is most difficult in steel mill plants since conductive dust particles can greatly shorten the arcing distance between the spray and separation electrodes and thus lead an accumulated occurrence of arcings.

The high-voltage for electrostatic precipitators is usually generated by rectifying the output signal of a high-voltage transformer that is driven by a mains-fed thyristor at the primary side. In the case of a voltage breakdown at the electric filter, a lightning-like discharge arc that can build up. A reliable method for quenching the arc is to wait for the next zero crossing of the primary currant and then blocking the firing pulses of the thyristor for a time interval and resupply the primary side of the high-voltage transformer only thereafter. So that the electric filter remains without high-voltage for an optimally short time span, the inverter should be immediately blocked given a breakdown, so that the current drops as fast as possible and, after the arc has been reliably quenched, can in turn build up as fast as possible by activating the inverter. For this reason, the power electronics of the inverter must be coupled over an optimally short path to the sensors that measure the voltage and the current at the electric filter in order to recognize a breakdown as soon as possible. Given a voltage breakdown at an electric filter, it has been shown that the inductances of the power supply lines can no longer be neglected due to the high currents that thereby occur and can lead to discontinuities in the voltage of the grounded potential of up to 15 kV in the region of the electric filter. Even given employment of coaxial cables, a dependable data transmission from the current and voltage sensors at the electric filter to the drive electronics of the inverter power part is no longer assured in the case of such discontinuities in potential, and the time behavior of the fast disconnect in the event of a voltage breakdown is negatively influenced as a consequence of transmission errors. These disadvantages are alleviated only slightly when the power electronics is arranged in the immediate proximity of the electric filter, since a reliable data transmission is already jeopardized even given distances of a few meters.

SUMMARY OF THE INVENTION

An object of the present invention is to fashion a power supply for electrostatic precipitators such that an optimally dependable operation is assured and such that maintenance personnel can access the power electronics without increased safety risk.

This problem is inventively in a power supply for an electric filter wherein the power electronics part is situated at a location at a distance from the electric filter and, wherein the control, particularly fast disconnect thereof given a voltage breakdown, is coupled via optical fibers to the arrangement for measured value acquisition and constantly receives measured results about the electrostatic precipitator therefrom.

The invention proceeds oppositely from earlier approaches with short connections between the electric filter and power electronics, and instead employs light waveguides for the transmission of measured results from the electrostatic precipitator to the power electronics, the fiber optic function without transmission errors given pronounced discontinuities in potential. Moreover, optical fibers have a high limit frequency and therefore can be operated with a high data transmission rate, so that a sampling of the measured results of the electric filter at time intervals of about 100 microseconds is unproblematically possible, and the data thereby acquired can be transmitted online via light waveguides to the drive circuit for the power electronics, i.e. with an optimally slight time offset. Since the power electronics is supplied from a standard 380 V network, the voltage at the intermediate circuit is barely higher than 500 V and it is therefore completely safe to install the components of the inverter in a commercially obtainable control box that, for example, is disposed in a switch room. It is completely non-hazardous to approach the closed control box and to read measuring instruments or to manually actuate switches. Of course, commands or other information also can be transmitted from such a switch or control room to a device that coordinates the measurements on site and edits the results, so that a bidirectional communication via optical fibers arises.

It has proven favorable for the communication between the power electronics part and/or the switch or control room and the device installed in the region of the electrostatic precipitator, to ensue via respective control assemblies for coordinating the measurements and for editing the measured results for data transmission. These control assemblies are preferably realized with integrated sequential circuits in the form of microprocessors or micro-controllers, with which the interface modules for coupling to the light waveguide can be a discrete component can be integrated together with the control component.

An especially important aspect of the invention is a separate light waveguide for each direction for bidirectional communication between the power electronics and/or the switch or control room, and the measured value acquisition arrangement, particularly via the respectively allocated control and/or interface modules. This has the significant advantage that commands asynchronously generated in a switch room need not wait for a gap in the data transmission of the measured results, nor does an interruption of the data transmission have to be produced, but the commands can be transmitted completely independently, and can be transmitted via their own interface modules. As a result, waiting times are not produced, and the uninterrupted data transmission of measured results to the power electronics part is assured even given transmission of control commands to the measured value acquisition arrangement.

The assemblies communicating with each other via optical fibers can have a respective serial input and a serial output. For reducing the component outlay as well as for avoiding transmission errors, in accordance with the invention only a single optical fiber can be employed for each data direction and the data be serially transmitted thereover. This can be achieved with an appropriate increase of the clock rate is correspondingly, so that the measured results can be serially transmitted via the light waveguide undelayed in the form of digital signals and with the required place precision.

To this end, the interface modules of the assemblies communicating with one another via light waveguides inventively are configured such that the data are transmitted with a frequency of more than 500 kHz. The preferred data transmission rate lies at about 625 kBaud and can be increased more dependent on the type and number of types of information to be transmitted.

In a preferred embodiment of the invention, a two-lead conductor cable proceeds from a switch or control room, particularly from the control box accepting the power electronics part, to the measured value acquisition arrangement for supplying the latter with energy. Via this line, preferably constructed as a copper cable, the measured value acquisition arrangement is supplied with current, preferably in the form of an alternating voltage with 220 V/50 Hz that is transformed down and rectified in the measured value acquisition arrangement in order to obtain a d.c. voltage of, for example, 5 V.

The power supply conduit can be formed by a coaxial cable for attenuating interfering noise spikes.

Preferably, the power supply line is grounded only in the region of the control box accepting the power electronics, whereas it is connected to the measured value acquisition arrangement via an isolating transformer, so that a capacitive coupling to the group potential expressly ensues in this region, and thus there is a certain drift possibility. The discontinuities in potential have less and less an effect on the power supply that becomes smaller as the stray capacitances of the primary-side winding of the isolating transformer for the power supply of the measuring electronic compared to the ground potential becomes lower, and the power supply of the means for measured value acquisition can be assured with an adequately dimensioned holding capacitor.

The installation outlay can be reduced further by surrounding the two light waveguides for the bidirectional data transmission from/to the means for measured value acquisition arrangement, and the two-lead for the energy supply thereof, with a common cable cladding. Since there is thus only a single cable connection to the measuring arrangement installed on site, transmission errors can be largely precluded by a conscientious installation of the connecting cable. If errors occur, it is only necessary to inspect a single cable, and the volume resistance of the copper lines can be checked at the other end by shorting the ends of the two copper leads in order to obtain further information as to whether the cable is damaged.

The inventive arrangement also can be optimized by galvanically connecting the measuring electronics of the measured value acquisition arrangement to the grounded potential of the electric filter. This, for example, can ensue by grounding a terminal of a rectifier following the secondary side of the isolating transformer and leads thereto so that the reference potential of the measuring electronics can replicate all discontinuities in potential of the ground potential in the region of the electric filter. Small relative voltages with reference to the common ground potential at the electric filter given great discontinuities in potential thus also can be reliably acquired.

Further advantages of the invention are that the primary-side test inputs of the measured value acquisition arrangement are coupled to the electric filter via protective interconnections. Such protective interconnections ensure that, even given interfering voltage spikes, there is no risk whatsoever of damage to the measuring electronics, particularly to an integrated control module.

The signal inputs of the measured value acquisition arrangement are preferably coupled to the electrical terminals of the electric filter via a voltage divider or a shunt. In such a case, the current and voltage measurement can ensue directly at the posts of the electric filter and thus remains unfalsified, compared to a voltage that drops due to stray inductances of leads.

A preparatory measure for the transmission of the acquired measured results via optical fibers is to allocate analog-to-digital converters to the signal inputs coupled to the electrical terminals of the electric filter via voltage dividers or shunts. In contrast to analog values, digital values can be comfortably transmitted via light waveguides as serial bit patterns.

In order to enable a serial transmission of data via light waveguides, the amplitude values acquired by sampling and digital conversion must first be stored in a memory coupled to the digital outputs of the analog-to-digital converters or to a processing module connected thereto. A pre-processing, for example an adaptation of the range of measurement or the like, can already be undertaken upon storage. The data are kept available in the memory not only for the subsequent transmission via light waveguides but can also for another out for a further, internal processing.

Whereas the transmission of the intermediately stored measured results from the memory to the interface module can be assumed by a higher-ranking control assembly, it is also possible to provide a further output at the memory module to which an interface module can then be directly coupled. The memory addresses employed as buffer memories can be written in cyclical sequence and be read out from the interface module in the same sequence, so that no data are lost. If, however, a data backup has occurred in the buffer memory, measured results that have been superseded in the meantime should be skipped, so that the measured results arriving at the power electronics component are as current as possible. It is therefore meaningful to compare the most recently written memory address to the most recently read out memory address and to trigger a jump to the current measured values given too large an offset. Of course, the address of the current measured values can also be interrogated before every data transmission in order to automatically assure an optimally slight delay time in the data transmission in this way.

In accordance with the invention the measured value acquisition arrangement can be realized with an integrated circuit. Because optimally few components, ideally only a single component, are employed, all required assemblies such as analog-to-digital converters, arithmetic logical unit (ALU) as a centralized control, program and buffer memories as well as interface modules can be concentrated on a smallest possible spatial area by integration, so that the interference of noise voltages on connecting lines is largely precluded. In this case, moreover, the data processing can ensue with a maximum clock frequency.

DESCRIPTION OF THE PREFERRED EMBODIMENTS

Figure 1:
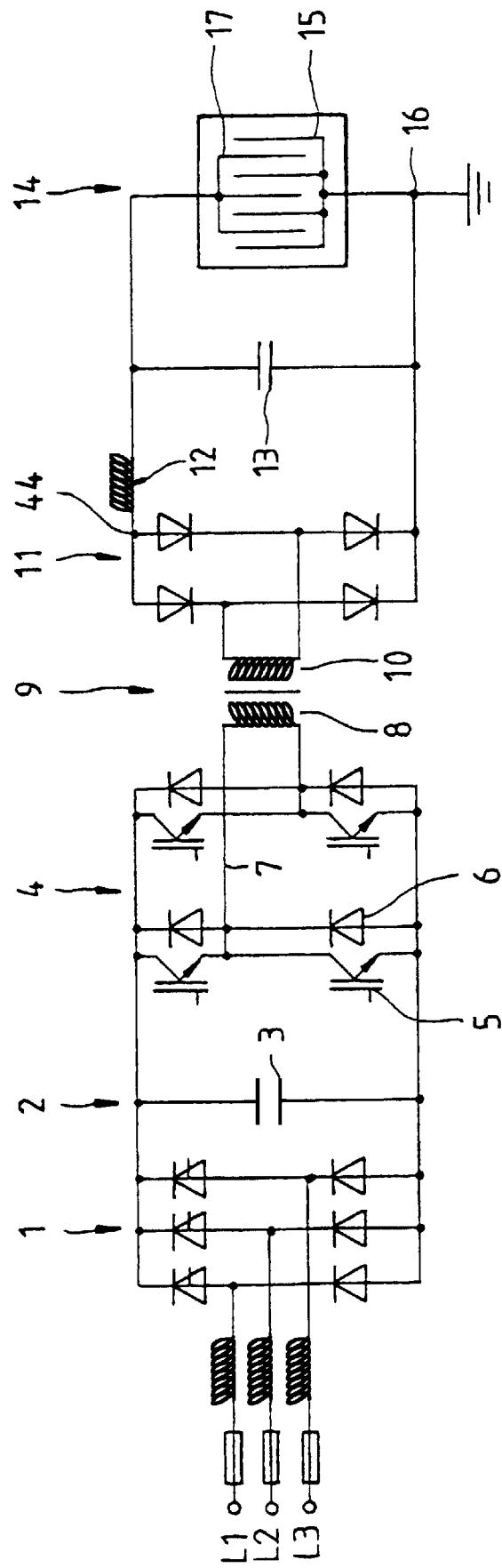
FIG. 1 shows the power circuit of a power supply of an electric filter in accordance with the invention.

In the circuit shown in FIG. 1, a rectifier 1 for an intermediate voltage circuit 2 with a voltage link capacitor 3 is connected to a 380 V three-phase mains network L1, L2, L3. An H-bridge circuit constructed with IGBT transistors 5 and unbiased diodes 6 connected with opposite polarity thereto serves as an inverter, the primary winding 8 of a high-voltage transformer 9 being connected in the bridge arm 7 of the H-bridge circuit. A diode rectifier 11 in Grätz circuitry is connected to the secondary winding 10 of the high-voltage transformer 9, and the stepped-up d.c. voltage, for example 110 kV, proceeds to the electric filter 14 via an inductor coil 12 and a capacitor 13. The plate-shaped electrodes 15 of the electric filter 14 are connected to the grounded, positive pole 16 of the rectifier 11, whereas the spray electrodes 17 charged negatively relative thereto are coupled to the negative pole 44 of the rectifier 11. High corona discharge currents flow in the electric filter until a direct voltage puncture occurs between a spray electrode 17 and a plate-shaped electrode 15. The voltage at the capacitor 13 then collapses as a result of high discharge currents, and the IGBT transistors 5 must be inhibited at the same time so that the output current at the rectifier 11 drops rapidly and falls below a critical value after a short time span that leads to a quenching of the arc in the electric filter 14. The inverter 4 then can be re-activated in order to return the voltage at the electric filter 14 to the nominal voltage via the high-voltage transformer 9 and the rectifier 11.

It is necessary for a high dynamics of the control of the inverse rectifier 4 that the measured values regarding current and voltage at the electrodes 15, 17 of the electric filter 14 proceed as undelayed as possible to the drive circuit for the inverse rectifier 4.

In accordance with the invention, the controllable power part 4 together with the mains-side circuitry 1, 2 is arranged in a control box 18 remote from the electrostatic precipitator 14. The high-voltage transformer 9, rectifier 11 as well as coil 12 and capacitor 13, in contrast, are arranged in the immediate proximity of the electric filter 14. An arrangement 19 for acquiring measured values regarding voltage and current at the electrodes 15, 17 of the electric filter 14 as well as for acquiring further information, for example about temperature, oil pressure of the transformer 9, etc., is likewise situated in the immediate proximity of the electric filter 14.

Figure 2:
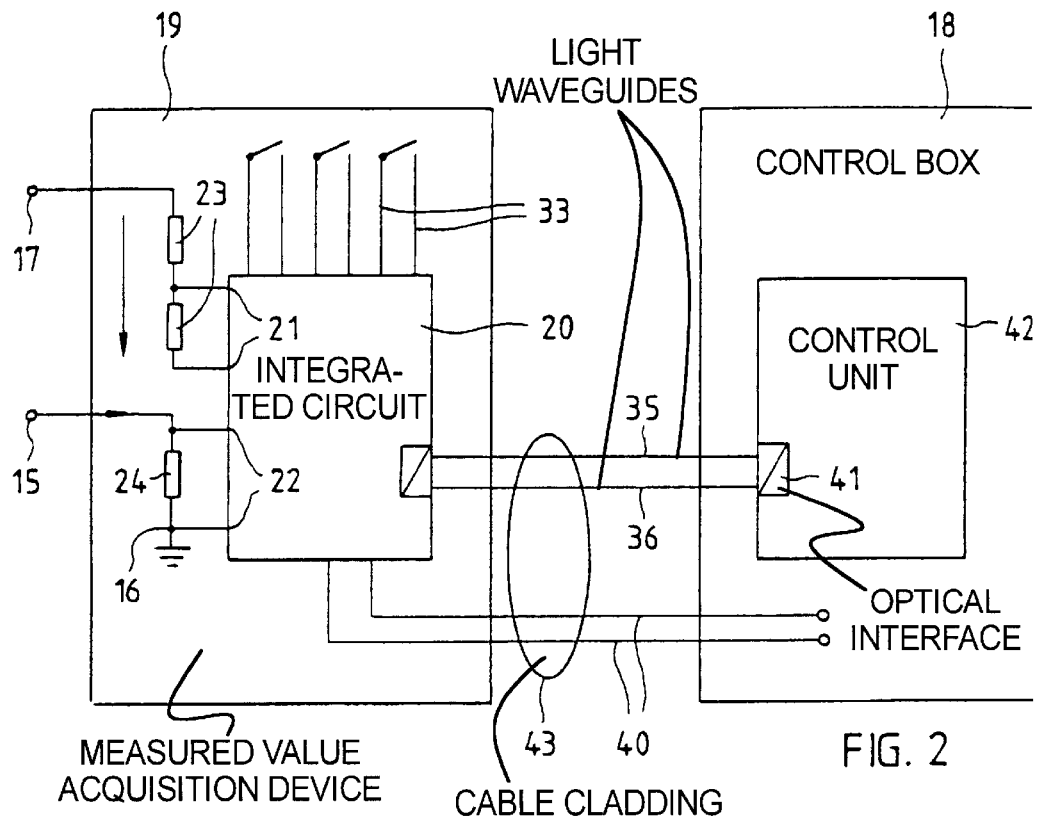
FIG. 2 is a block circuit diagram of the components for the acquisition and forwarding of measured values of the electric filter of FIG. 1.
Figure 3:
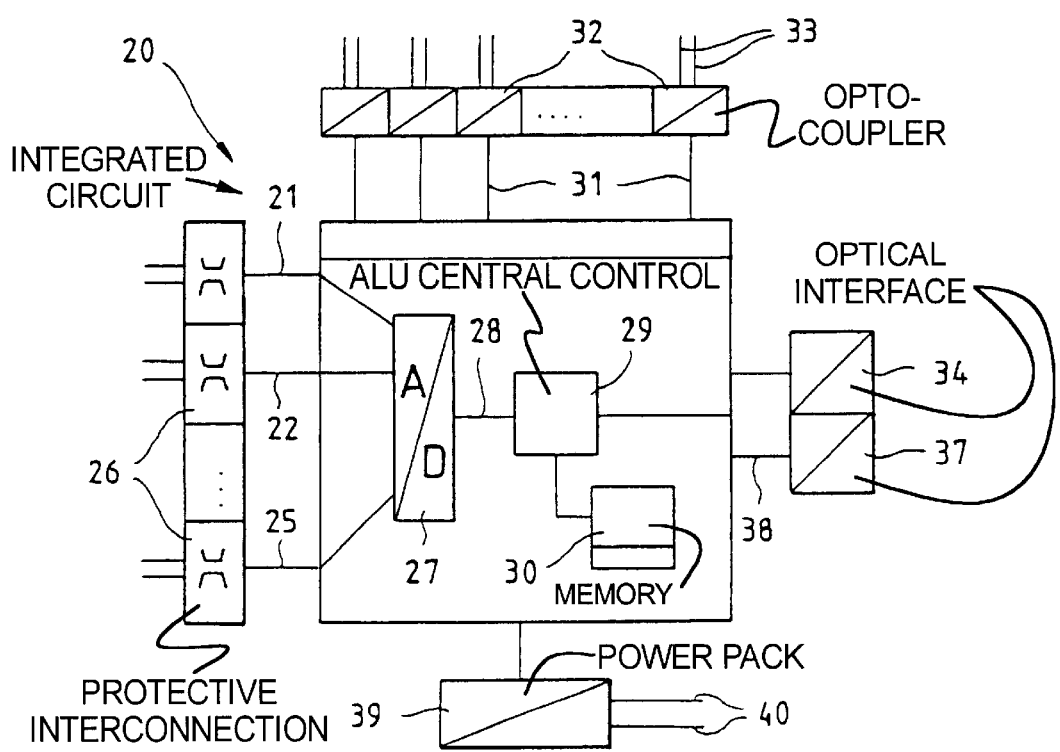
FIG. 3 shows the internal structure of the measured value acquisition arrangement of FIG. 2.

As FIG. 2 shows, the measuring electronics within the arrangement 19 for measured value acquisition is preferably combined in a single integrated circuit 20 in order to be largely insensitive to discontinuities in potential of the ground potential 16. The integrated circuit 20 has two analog inputs 21, 22 that can be fashioned as difference inputs. An input 21 sensing the voltage between the electrodes 15, 17 of the electric filter 14 is connected via a voltage divider 23 to the non-grounded, negative electrode 17 of the electric filter 14, whereas the second analog input 22 is coupled via a shunt looped into the lead to the grounded 16 electrode 15 of the electric filter 14 in order to detect the current flowing across this electrode 15. As FIG. 3 also shows, these analog inputs 21, 22, as well as further inputs 25 (if present), are connected to the measuring sensors 23, 24, or to the electrodes 15, 17 to be measured via protective interconnections 26, for example in the form of over-voltage protection diodes. As a result, interfering noise voltage spikes are kept away from the integrated circuit 20.

The analog inputs 21, 22, 25 are coupled to an analog-to-digital converter 27. Either a single analog-to-digital converter can be integrated in the circuit 20, this then being switched between the various inputs 21, 22, 25 in the fashion of a demultiplexer, or a separate analog-to-digital converter can be allocated to each of these analog inputs.

The output 28 of such a converter module 27 is then connected to the actual central control 29 of the integrated circuit 20, which is preferably realized as arithmetic logic unit (ALU), and thus can undertake a pre-processing of the digitalized measured results 28 as well as a storage thereof in a buffer memory 30. Similarly, the ALU central control 29 can be connected to a number of digital inputs 31 that are in turn connected via opto-couplers 32 to digital output signals 33 of the electric filter 14.

Further, the ALU central control 29 serves as an interface for the output of data to an optical interface 34 that is coupled to a light waveguide 35. Light signals arriving on a second, parallel light waveguide 36 are converted into electrical signals 38 with a further optoelectronic interface 37, these electrical signals 38 being likewise capable of being received by the ALU central control 29 and further-processed.

The integrated circuit 20 is supplied with energy via a power pack 39 that is connected at the primary side to a two-lead copper line 40. The integrated circuit 20 is supplied through this arrangement with an alternating voltage of, for example, 220 V from the control box 18. In the power pack 39, an isolating transformer transforms this alternating voltage down to a voltage suitable for the electronics 20 and subsequently rectifies it. A secondary-side connection of the rectifier is preferably galvanically connected to the ground potential 16 in the region of the electric filter 14, so that all discontinuities in potential in the case of a voltage breakthrough can be unproblematically restored by the control electronics 20.

As FIG. 2 shows, an optical interface 41 is likewise provided in the region of the control box 18, this optical interface 41 being capable of communicating bidirectionally with the two optical fibers 35, 36 in parallel. This optical interface 41 converts data signals arriving on the light waveguide 35 into electrical signals and therefore makes a further-processing possible in the framework of an integrated circuit 42 or of a micro-controller. Further, control commands, clock signals or the like are generated by the control module 42 and transmitted via the optical interface 41 and the second light waveguide 36 to the integrated circuit 22 of the measured value acquisition arrangement 19. As a result of employing two fibre optic 35, 36, the transmission of measured results to the control box 18 accepting the power electronics 4 need not be interrupted if control commands are simultaneously sent to the means 19 for measured value acquisition. For simplifying the installation, the two light waveguides 35, 36 together with the two-lead power supply line 40 are surrounded by a common cable cladding.

Although modifications and changes may be suggested by those skilled in the art, it is the intention of the inventor to embody within the patent warranted hereon all changes and modifications as reasonably and properly come within the scope of his contribution to the art.

I claim as my invention:

1. An electrostatic precipitator and power supply combination comprising:
    an electrostatic precipitator having an operating characteristic associated therewith indicative of a need to immediately disconnect power from said electrostatic precipitator;
    a controllable power supply for supplying power to said electrostatic precipitator, said controllable power supply comprising a power electronics stage containing a rectifier, an inverter, and an intermediate circuit connected between said rectifier and said inverter;
    a high-voltage rectifier connected across said electrostatic precipitator;
    a transformer connected between said inverter and said high-voltage rectifier;
    a measured value acquisition device for acquiring a measured value representing said characteristic;
    said high-voltage rectifier and said measured value acquisition device being disposed in immediate proximity to said electrostatic precipitator and said power electronics stage being disposed remote from said electrostatic precipitator; and
    at least one optical conductor connected between said measured value acquisition device and said power electronics stage for supplying said measured value to said power electronics stage, and said power electronics stage discontinuing power supply to said electrostatic precipitator in response thereto.

2. A power supply and electrostatic precipitator combination as claimed in claim 1 further comprising a first control unit connected to said measured value acquisition device and a second control unit connected to said power electronics stage, said at least one optical conductor being connected between said first and second control units.

3. A power supply and electrostatic precipitator combination as claimed in claim 2 further comprising a further optical conductor connected between said first and second control units, said optical conductor and said further optical conductor allowing bi-directional communication between said power electronics stage and said measured value acquisition device.

4. A power supply and electrostatic precipitator combination as claimed in claim 3 wherein said first control unit has a serial output connected to said further optical conductor and a serial input connected to said optical conductor, and wherein said second control unit has a serial input connected to said further optical waveguide and a serial output connected to said optical conductor.

5. A power supply and electrostatic precipitator combination as claimed in claim 3 further comprising a two-lead conductor cable connected between said power electronics stage and said measured value acquisition device for supplying power from said power electronic stage to said measured value acquisition device.

6. A power supply and electrostatic precipitator combination as claimed in claim 5 wherein said two-lead conductor cable is a coaxial cable.

7. A power supply and electrostatic precipitator combination as claimed in claim 5 comprising a control box in which said power electronics stage is disposed, and wherein said two-lead conductor cable is grounded only at said control box.

8. A power supply and electrostatic precipitator combination as claimed in claim 5 further comprising an isolating transformer connected in said two-lead conductor cable.

9. A power supply and electrostatic precipitator combination as claimed in claim 5 comprising a common cable cladding surrounding said optical conductor, said further optical conductor and said two-lead conductor cable.

10. A power supply and electrostatic precipitator combination as claimed in claim 3 wherein said first control unit contains a first interface module and wherein said second control unit contains a second interface module, and wherein said first and second interface modules are connected to the optical conductor and the further optical conductor for transmitting data at a frequency greater than 500 kHz.

11. A power supply and electrostatic precipitator combination as claimed in claim 1 wherein said electrostatic precipitator has a ground potential associated therewith, and wherein said measured value acquisition device is galvanically connected at said ground potential.

12. A power supply and electrostatic precipitator combination as claimed in claim 1 wherein said measured value acquisition device has signal inputs, and further comprising protective interconnections coupling said test inputs to said electrostatic precipitator.

13. A power supply and electrostatic precipitator combination as claimed in claim 12 wherein said protective interconnections comprise voltage dividers.

14. A power supply and electrostatic precipitator combination as claimed in claim 12 wherein said protective interconnections comprise shunts.

15. A power supply and electrostatic precipitator combination as claimed in claim 12 further comprising at least one analog-to-digital converter connected to said test inputs.

16. A power supply and electrostatic precipitator combination as claimed in claim 15 wherein said analog-to-digital converter has a digital output, and further comprising a memory connected to said digital output for storing said measured value.

17. A power supply and electrostatic precipitator combination as claimed in claim 16 wherein said analog-to-digital converter has a digital output, and further comprising a processing module which receives said measured value from said digital output and processes said measured value to produce a processed value, and further comprising a memory connected to said processing module for storing said processed value.

18. A power supply and electrostatic precipitator combination as claimed in claim 17 further comprising an interface module connected to said memory for supplying said processed value from said memory to said power electronics stage via said optical conductor.

19. A power supply and electrostatic precipitator combination as claimed in claim 16 wherein said analog-to-digital converter has a digital output, and further comprising a processing module connected to said digital output for receiving said measured value and producing a processed value therefrom, and an interface module connected to said processing module for transmitting said processed value to said power electronics stage via said optical conductor.

20. A power supply and electrostatic precipitator combination as claimed in claim 1 wherein said measured value acquisition device is an integrated circuit.

* * * * *